United States Patent
Masuda et al.

(10) Patent No.: US 9,199,573 B2
(45) Date of Patent: Dec. 1, 2015

(54) VEHICLE LIGHT DISTRIBUTION CONTROL DEVICE AND VEHICLE LIGHT DISTRIBUTION CONTROL METHOD

(75) Inventors: Sho Masuda, Toyota (JP); Kazuhiko Nakashima, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/234,484

(22) PCT Filed: Jul. 17, 2012

(86) PCT No.: PCT/IB2012/001397
§ 371 (c)(1),
(2), (4) Date: Apr. 11, 2014

(87) PCT Pub. No.: WO2013/014508
PCT Pub. Date: Jan. 31, 2013

(65) Prior Publication Data
US 2014/0232265 A1    Aug. 21, 2014

(30) Foreign Application Priority Data
Jul. 25, 2011    (JP) .................................. 2011-162355

(51) Int. Cl.
*B60Q 1/14* (2006.01)
*B60Q 1/08* (2006.01)

(52) U.S. Cl.
CPC ................ *B60Q 1/08* (2013.01); *B60Q 1/1423* (2013.01); *B60Q 2300/146* (2013.01)

(58) Field of Classification Search
CPC ........ B60Q 1/0425; B60Q 1/045; B60Q 1/08; B60Q 1/085; B60Q 1/115; B60Q 1/122; B60Q 1/1423; B60Q 2300/05; B60Q 2300/146

USPC ............................... 315/77–83; 365/464–468
See application file for complete search history.

(56) References Cited

U.S. PATENT DOCUMENTS

| | | | |
|---|---|---|---|
| 6,312,147 B2 * | 11/2001 | Eichler | 362/539 |
| 6,623,147 B2 * | 9/2003 | Hayami et al. | 362/467 |
| 7,440,828 B2 * | 10/2008 | Tooyama | 701/34.4 |
| 7,477,976 B2 * | 1/2009 | Horii et al. | 701/49 |
| 8,552,648 B2 * | 10/2013 | Hayakawa | 315/82 |
| 2002/0057573 A1 * | 5/2002 | Kondo et al. | 362/465 |
| 2006/0139938 A1 * | 6/2006 | Hayami | 362/466 |
| 2010/0309674 A1 * | 12/2010 | Su et al. | 362/466 |
| 2012/0002430 A1 * | 1/2012 | Yamazaki et al. | 362/464 |
| 2013/0308326 A1 * | 11/2013 | Kasaba et al. | 362/465 |
| 2013/0308328 A1 * | 11/2013 | Rice et al. | 362/516 |

FOREIGN PATENT DOCUMENTS

| | | |
|---|---|---|
| DE | 10 2005 061 094 A1 | 9/2006 |
| EP | 2 266 838 A1 | 12/2010 |
| EP | 2 295 291 A1 | 3/2011 |
| JP | 2000-233679 A | 8/2000 |
| JP | 2004-168209 A | 6/2004 |
| JP | 2011-005992 A | 1/2011 |
| JP | 2011-063070 A | 3/2011 |

* cited by examiner

*Primary Examiner* — Alexander H Taningco
*Assistant Examiner* — Kurtis R Bahr
(74) *Attorney, Agent, or Firm* — Sughrue Mion, PLLC

(57) ABSTRACT

When occurrence of a failure associated with light distribution control has been detected during high beam irradiation, a low beam irradiation direction is changed upward and then the high beam irradiation is stopped, and subsequently the low beam irradiation direction is gradually returned downward. The time during high beam irradiation includes the time during which variable high beam light distribution control in which part of high beam light is shielded by a shade is being executed.

5 Claims, 8 Drawing Sheets

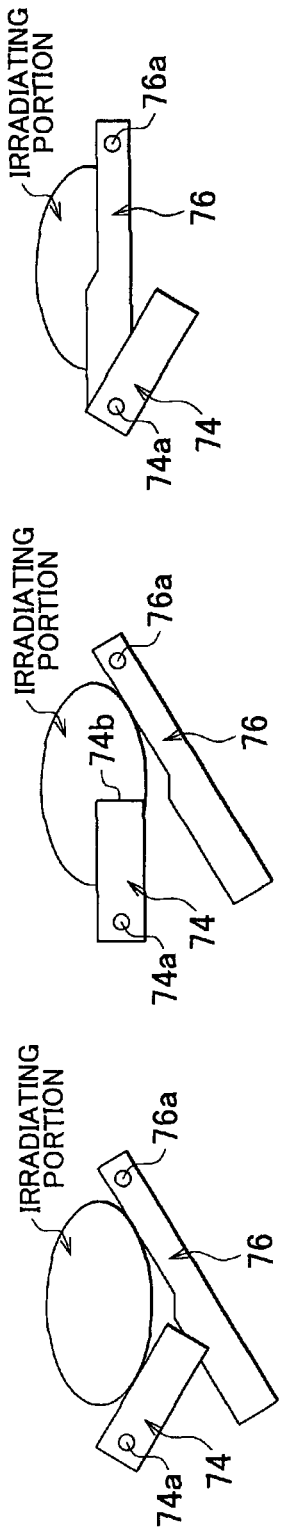

VEHICLE LIGHT DISTRIBUTION CONTROL DEVICE AND VEHICLE LIGHT DISTRIBUTION CONTROL METHOD

BACKGROUND OF THE INVENTION

1. Field of the Invention

The invention relates to a vehicle light distribution control device and a vehicle light distribution control method.

2. Description of Related Art

There is known an existing in-vehicle lamp control device that, when an abnormality of any one of a low beam head lamp and a high beam head lamp has been detected, executes fail-safe process in which the other one of the low beam head lamp and the high beam head lamp, which is in a normal condition, is turned on instead of the one of the head lamps, which is in an abnormal condition (for example, see Japanese Patent Application Publication No. 2000-233679 A (JP 2000-233679 A)).

In addition, there is known variable high beam light distribution control in which, in order not to cause a driver, or the like, of a vehicle ahead, such as a leading vehicle and an oncoming vehicle, to experience glare, the light distribution of illumination light for illuminating an area ahead of a vehicle is controlled on the basis of a vehicle ahead, detected by a camera (for example, see Japanese Patent Application Publication No. 2011-005992 (JP 2011-005992 A) and Japanese Patent Application Publication No. 2011-063070 (JP 2011-063070 A)).

However, in a vehicle light distribution control device that executes the above described variable high beam light distribution control, when there occurs a failure during variable high beam light distribution control, it is required to stop high beam irradiation and change the light distribution into low beam irradiation. At this time, when high beam irradiation is stopped and the light distribution is changed into low beam irradiation immediately after there occurs a failure, there is an inconvenience that the visibility of a distant area steeply decreases. This inconvenience not only occurs in variable high beam light distribution control but also can occur in other light distribution control, such as automatic high beam control.

SUMMARY OF THE INVENTION

The invention provides a vehicle light distribution control device and vehicle light distribution control method, which, when light distribution control is stopped because of occurrence of a failure, are able to change the light distribution into low beam irradiation such that a decrease in visibility is reduced.

A first aspect of the invention provides a vehicle light distribution control device. The vehicle light distribution control device is configured such that, when occurrence of a failure associated with light distribution control has been detected during high beam irradiation, a low beam irradiation direction is changed upward and then the high beam irradiation is stopped, and subsequently the low beam irradiation direction is gradually returned downward.

In the vehicle light distribution control device, the time during the high beam irradiation may include the time during which variable high beam light distribution control in which part of high beam light is shielded by a shade is being executed.

A second aspect of the invention provides a vehicle light distribution control device. The vehicle light distribution control device includes: an illumination device that irradiates illumination light toward a front of a vehicle, that is controlled such that a light distribution pattern is changed at least between a high beam pattern and a low beam pattern, and that is controlled such that an optical axis direction varies in a substantially vertical direction; and a control unit that controls the illumination device. When occurrence of a failure associated with light distribution control has been detected during high beam irradiation, the control unit changes a low beam irradiation direction upward and then stops the high beam irradiation, and subsequently gradually returns the low beam irradiation direction downward.

A third aspect of the invention provides a vehicle light distribution control method. The vehicle light distribution control method includes: detecting occurrence of a failure associated with light distribution control during high beam irradiation; when occurrence of the failure has been detected, changing a low beam irradiation direction upward; stopping the high beam irradiation after changing the low beam irradiation direction upward; and gradually returning the low beam irradiation direction downward after stopping the high beam irradiation.

The vehicle light distribution control method may further include, when the detected failure is continuously occurring, maintaining the low beam irradiation direction in a normal direction.

According to the aspects of the invention, it is possible to obtain a vehicle light distribution control device and vehicle light distribution control method, which, when light distribution control is stopped because of occurrence of a failure, are able to change the light distribution into low beam irradiation such that a decrease in visibility is reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A to FIG. 3C are views that schematically show an example of a light distribution changing shade, and are views along the optical axis direction;

DETAILED DESCRIPTION OF EMBODIMENTS

Hereinafter, an embodiment of the invention will be described with reference to the accompanying drawings.

Figure 1:
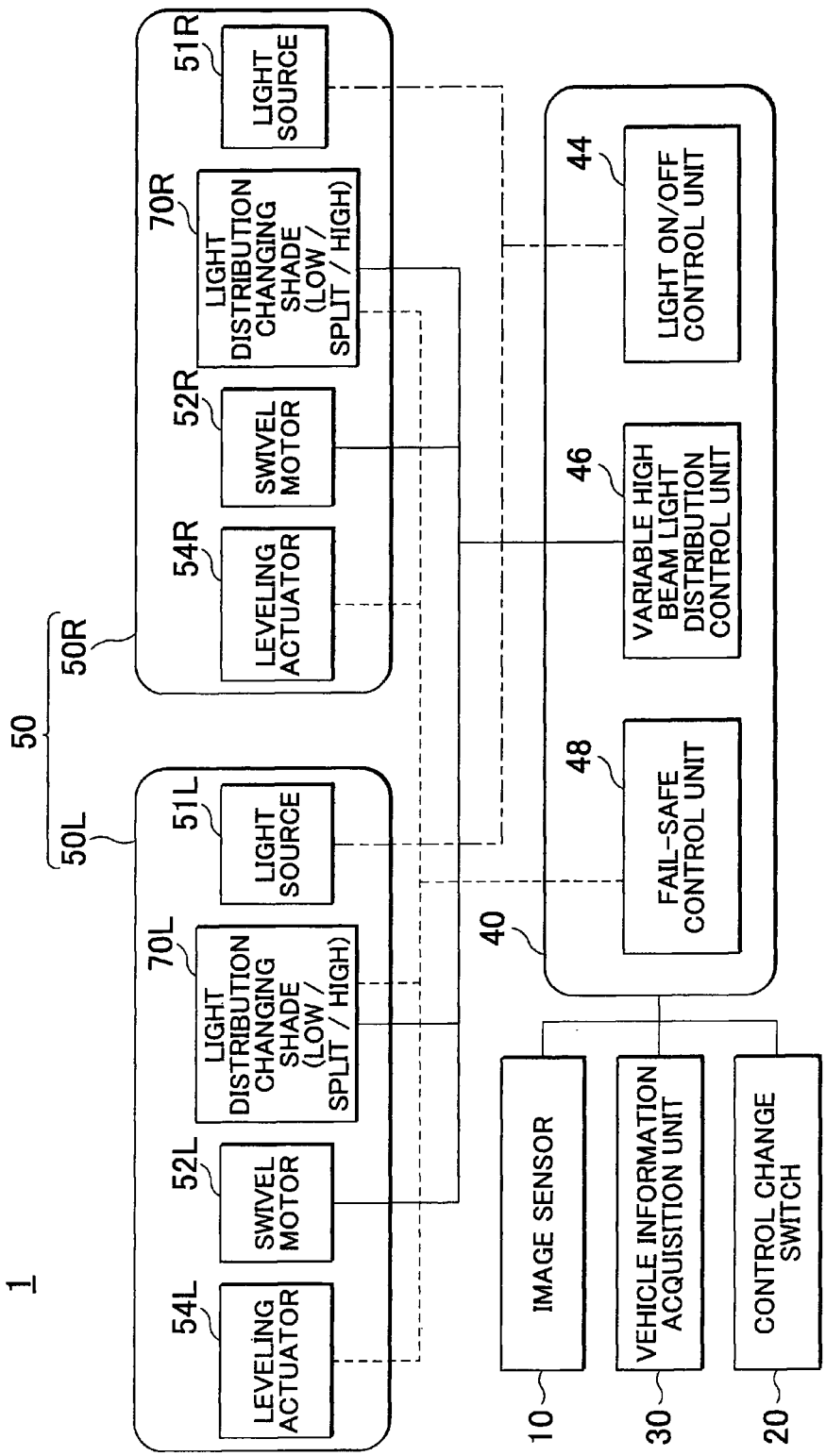
FIG. 1 is a configuration view of a relevant portion of a vehicle light distribution control device according to an embodiment of the invention.
Figure 2:
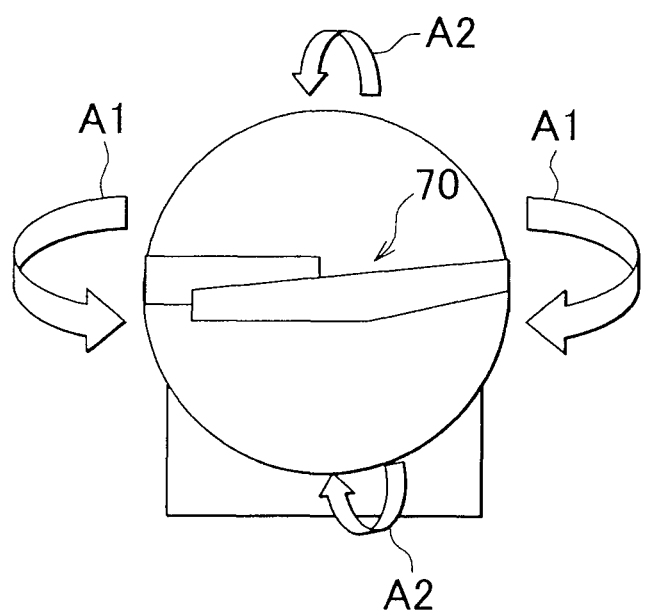
FIG. 2 is a front view that schematically shows an example of a head lamp.

FIG. 1 is a configuration view of a relevant portion of a vehicle light distribution control device 1 according to the embodiment of the invention. FIG. 2 is a front view that schematically shows an example of each head lamp 50.

The vehicle light distribution control device 1 includes an image sensor 10, a control change switch 20, a vehicle information acquisition unit 30, an electronic control unit (ECU) 40 and right and left head lamps 50.

The image sensor 10 is formed of a camera. The image sensor 10 captures the image of a scene ahead of a vehicle (front environment image) with the use of an imaging device, such as a charge-coupled device (CCD) and a complementary metal oxide semiconductor (CMOS). The image sensor 10 is mounted on a vehicle so as to be able to capture the image of a scene ahead of the vehicle. For example, the image sensor 10 is, for example, installed on the back side (face on the front side of the vehicle) of a rearview mirror. The image sensor 10 may be configured to acquire a front environment image in real time while the vehicle is running and to, for example, supply the acquired front environment image to the ECU 40 in a stream format of a predetermined frame period. Note that the image sensor 10 may be an exclusive sensor for vehicle light distribution control described below or may also be used in another application (for example, a forward looking camera, a camera for lane keep assist, or the like). In addition, the image sensor 10 may be a camera that acquires any one of a color image and a monochrome image.

The control change switch 20 includes switches associated with head lamp operations, such as on/off states of the head lamps 50 and variable high beam light distribution control on/off states of the head lamps 50. The control change switch 20 may be arranged at an appropriate position, such as a steering column, in a vehicle cabin. Note that variable high beam light distribution control over the head lamps 50 may be automatically executed at the time when the head lamps 50 are turned on or may be automatically executed at the time when a high beam is used. In addition, variable high beam light distribution control may be executed only when adaptive front-lighting system (AFS) control is activated. The AFS control is light distribution control based on a vehicle travelling direction.

The ECU 40 is formed as a microcomputer. The microcomputer is formed of a CPU, a ROM, a RAM, and the like, that are connected to one another via a bus (not shown). The ECU 40 includes a light on/off control unit 44, a variable high beam light distribution control unit 46 and a fail-safe control unit 48 as major functions. These units 44, 46 and 48 may be formed of software, hardware or a combination of them. For example, the units 44, 46 and 48 may be implemented such that the CPU executes programs stored in a storage device, such as the ROM. In addition, these units 44, 46 and 48 do not always need to be incorporated into the same ECU unit; instead, these units 44, 46 and 48 may be implemented by cooperation of a plurality of ECUs.

The head lamps 50 are respectively provided at the front right and front left of the vehicle. Note that, in the following description, when the right and left head lamps 50 are specifically distinguished from each other, "R" is suffixed to the reference numerals for the right head lamp and its component elements, and "L" is suffixed to the reference numerals for the left head lamp and its component elements. Each of the head lamps 50 functions as a low beam and a high beam that irradiate visible light toward an area ahead of the vehicle. The low beam and the high beam may be respectively formed by exclusive lamps or may be implemented by changing the position of a light distribution changing shade with the use of a single lamp (see FIG. 2). Each head lamp 50 includes a swivel motor 52, a leveling actuator 54 and a light distribution changing shade 70.

As is schematically indicated by the arrows A1 in FIG. 2, the swivel motor 52 changes the direction of the optical axis of a corresponding one of the head lamps 50 within a substantially horizontal plane. The swivel motor 52 is typically installed at the lower bottom portion of the holder of the head lamp 50. When the holder is driven for rotation (swiveled) by the swivel motor 52, the direction of the optical axis of the head lamp 50 is changed within the substantially horizontal plane.

As is schematically indicated by the arrows A2 in FIG. 2, the leveling actuator 54 changes the low beam irradiation direction of a corresponding one of the head lamps 50 upward. For example, the leveling actuator 54 may be configured to change the direction of the optical axis of a corresponding one of the head lamps 50 vertically. In this case, the leveling actuator 54 may change the vertical inclination of the holder with respect to the housing to thereby change the direction of the optical axis of a corresponding one of the head lamps 50 vertically.

Each head lamp 50 includes the light distribution changing shade 70. The light distribution changing shade 70 forms a light distribution pattern in which part of light emitted from a bulb is shielded. The light distribution changing shade 70 is driven for rotation by the shade driving actuators (not shown) to selectively form at least three types of patterns, that is, a high beam pattern, a low beam pattern and a split beam pattern. Examples of the structures and operations (respective patterns) of the shade will be described with reference to FIG. 3A to FIG. 3C, and the like.

FIG. 3A to FIG. 3C are views that schematically show an example of the light distribution changing shade 70, and are views along the optical axis direction. FIG. 3A to FIG. 3C schematically show the ranges of irradiating portions of the head lamp 50 in relation to the light distribution changing shade 70. Note that the irradiating portion is inverted by a lens. In FIG. 3A to FIG. 3C, FIG. 3A shows the state of the light distribution changing shade 70 at the time when the high beam pattern is formed, FIG. 3B shows the state of the light distribution changing shade 70 at the time when the split beam pattern is formed, and FIG. 3C shows the state of the light distribution changing shade 70 at the time when the low beam pattern is formed.

The light distribution changing shade 70 shown in FIG. 3A to FIG. 3C includes a one-side high beam shade 74 and a low beam shade 76 as the two sub-shades. The one-side high beam shade 74 has a length such that only the horizontal one side of the lower half of the irradiating portion of the head lamp 50 is shielded. The one-side high beam shade 74 of the right head lamp 50R and the one-side high beam shade 74 of the left head lamp 50L are provided at horizontally opposite sides such that the vehicle center side of each of the head lamps 50R and 50L is shielded. On the other hand, the low beam shade 76 has a length such that the entire horizontal lower half of the irradiating portion of the head lamp 50 is shielded. The one-side high beam shade 74 is supported so as to be rotatable about the rotation axis 74a within a substantially vertical plane (plane vertical to the optical axis). The low beam shade 76 is supported so as to be, rotatable about the rotation axis 76a within the substantially vertical plane. The one-side high beam shade 74 and the low beam shade 76 are respectively driven for rotation by the shade driving actuators provided respectively for the one-side high beam shade 74 and the low beam shade 76. By so doing, the one-side high beam shade 74 and the low beam shade 76 each are independently changeable between a retracted position and a shielding position. Note that the one-side high beam shade 74 and the low beam shade 76 may be driven in another mode. The one-side high beam shade 74 and the low beam shade 76 may be, for example, driven by a solenoid or may be driven for translational motion.

Figure 4A:
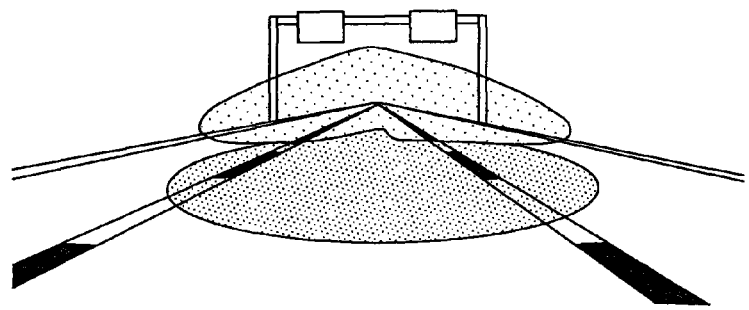
FIG. 4A to FIG. 4C are views that schematically show typical examples of light distribution patterns achieved by the light distribution changing shades.
Figure 4B:
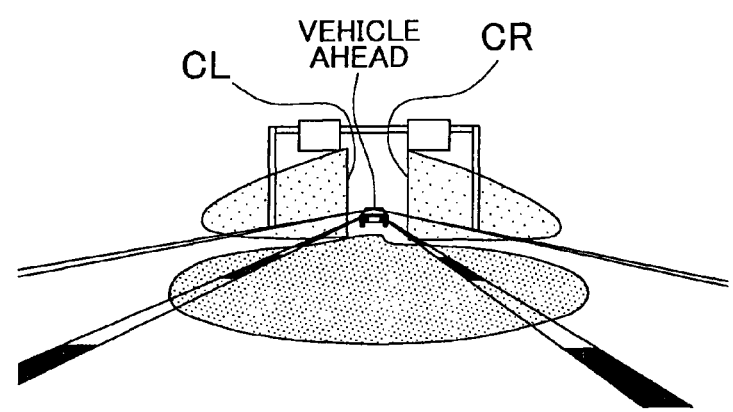
Figure 4C:
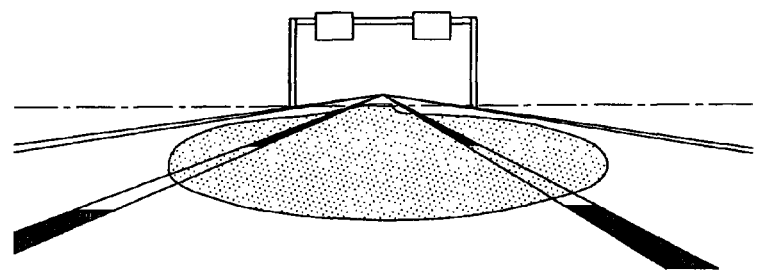

FIG. 4A to FIG. 4C are views that schematically show typical examples of light distribution patterns achieved by the light distribution changing shades 70.

FIG. 4A shows an example of the high beam pattern formed by the head lamps 50. The high beam pattern is formed such that the one-side high beam shades 74 and low beam shades 76 of both the right and left head lamps 50R and 50L are held in the retracted position (see FIG. 3A).

FIG. 4B shows an example of the split beam pattern formed by the head lamps 50. In FIG. 4B, cut-off lines CR and CL that are formed as boundaries by the edges 74b (see FIG. 3B) of the one-side high beam shades 74 are shown. The split beam pattern is formed such that the one-side high beam shades 74 of the right and left head lamps 50R and 50L each are held in the shielding position and the low beam shades 76 of the right and left head lamps 50R and 50L each are held in the retracted position (see FIG. 3B). The split beam pattern is formed such that part of an area in the high beam pattern is shielded with the cut-off lines CR and CL set as boundaries. In the example shown in FIG. 4B, the split beam pattern is formed such that an area adjacent to the vehicle center in the vehicle widthwise direction in the high beam pattern is shielded. The positions of the cut-off lines CR and CL may be changed by controlling the swivel angles (that is, the directions of the optical axes) of the right and left head lamps 50R and 50L.

FIG. 4C shows an example of the low beam pattern formed by the head lamp 50. The low beam pattern is formed such that the one-side high beam shades 74 of the right and left head lamps 50R and 50L each are held in the retracted position and the low beam shades 76 of the right and left head lamps 50L and 50R each are held in the shielding position (see FIG. 3C).

Figure 5:
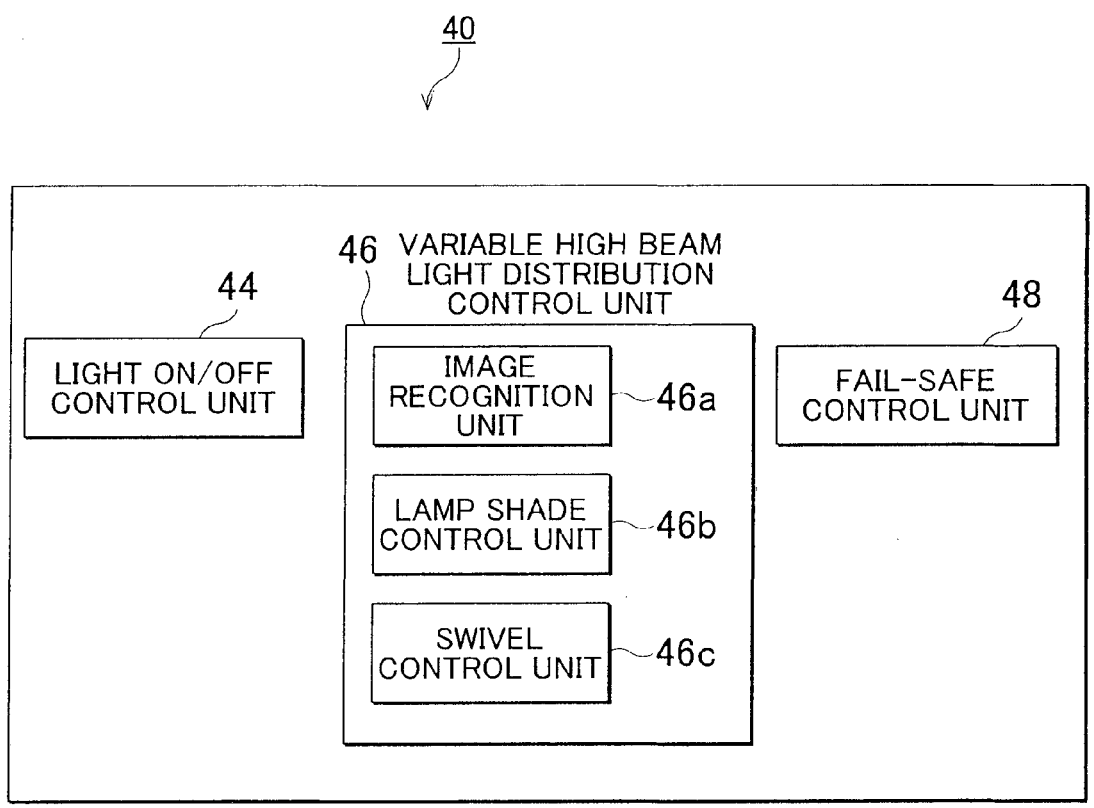
FIG. 5 is a block diagram that shows an example of major functions of an ECU of the embodiment.

FIG. 5 is a block diagram that shows an example of major functions of the ECU 40 of the present embodiment. As described above, the ECU 40 includes the light on/off control unit 44, the variable high beam light distribution control unit 46 and the fail-safe control unit 48 as major functions.

The light on/off control unit 44 changes the on/off states of the head lamps 50 on the basis of the state of the control change switch 20. Note that the light on/off control unit 44 may execute control to automatically turn on the head lamps 50 when surroundings become dark on the basis of a signal output from a sunshine sensor, or the like.

The variable high beam light distribution control unit 46 executes variable high beam light distribution control when variable high beam light distribution control is activated on the basis of the state of the control change switch 20. In the variable high beam light distribution control, the light distribution of illumination light for illuminating an area ahead of the vehicle is controlled on the basis of whether a vehicle ahead has been detected to reduce glare experienced by a driver, or the like, of the vehicle ahead.

As shown in FIG. 5, the variable high beam light distribution control unit 46 includes an image recognition unit 46a, a lamp shade control unit 46b and a swivel control unit 46c.

The image recognition unit 46a processes a front environment image obtained from the image sensor 10 to detect a vehicle ahead (a leading vehicle or an oncoming vehicle) that can be present ahead of the vehicle. There are various types of methods of detecting a vehicle ahead in the image, and any method may be employed. Typically, a vehicle ahead is a mobile unit and emits light from a brake lamp (or a tail lamp) and a head lamp, and includes a reflective portion (reflector) at the rear of the vehicle. The reflective portion reflects light received from the rear. Thus, a vehicle ahead in the image may be detected on the basis of the features of those light beams. For example, when the feature of light (high-luminance point) in the image satisfies the predetermined condition (brightness, color, size, the pattern of an edge shape, movement, and the like), an image regarding that light may be detected as a vehicle ahead. More specifically, an example of a method of detecting a vehicle ahead may be as follows. A front environment image obtained from the image sensor 10 is processed to detect light (pixels having a luminance higher than or equal to a predetermined luminance) in the image, and then it is determined whether the light is due to a vehicle ahead or disturbance light other than a vehicle ahead (reflected light due to a reflector of a road sign, or the like) on the basis of elements of brightness and movement of light (for example, the speed, travelling direction, and the like, of an object that emits light) and color (for example, the luminescent color of a brake lamp, the color of reflected light from the reflective portion, or the like) from the detected light. When the image recognition unit 46a has detected the presence of a vehicle ahead, the image recognition unit 46a may calculate the position, direction, and the like, of the vehicle ahead.

The lamp shade control unit 46b controls the light distribution pattern via the shade driving actuators 71. Specifically, the lamp shade control unit 46b controls the light distribution changing shades 70 with the use of the shade driving actuators 71 to control the light distribution pattern of the head lamps 50 on the basis of a situation of the vehicle ahead, detected by the image recognition unit 46a. Basically, the lamp shade control unit 46b controls the open/close states of the one-side high beam shades 74 and low beam shades 76 so as not to irradiate a high beam to the vehicle ahead on the basis of the position, direction, and the like, of the vehicle ahead, detected by the image recognition unit 46a.

The swivel control unit 46c controls the irradiation direction of the distribution pattern (the swivel angles of the head lamps 50) via the swivel motors 52. Specifically, the swivel control unit 46c controls the optical axis directions of the head lamps 50 with the use of the swivel motors 52 on the basis of the situation of the vehicle ahead, detected by the image recognition unit 46a. Basically, the swivel control unit 46c controls the optical axis directions of the head lamps 50 so as not to irradiate a high beam to the vehicle ahead on the basis of the position, direction, and the like, of the vehicle ahead, detected by the image recognition unit 46a.

The fail-safe control unit 48 detects a failure (abnormality) associated with variable high beam light distribution control, and, at the time when the fail-safe control unit 48 has detected the failure, executes predetermined fail-safe control in which the light distribution pattern is returned to the low beam pattern at the time when variable high beam light distribution control is stopped. During variable high beam light distribution control, typically, the split beam pattern or the high beam pattern is formed. When there occurs a failure during variable high beam light distribution control, the fail-safe control unit 48 changes the low beam irradiation direction upward with the use of the leveling actuators 54 and then stops high beam irradiation (in the examples shown in FIG. 3A to FIG. 3C, returns the light distribution pattern to the low beam pattern). Subsequently, the fail-safe control unit 48 gradually changes the low beam irradiation direction downward with the use of the leveling actuators 54. By so doing, even when there occurs a failure during variable high beam light distribution control, it is possible to change the light distribution into irradiation having only the low beam pattern such that a decrease in visibility is reduced. Irradiation having only the low beam pattern just indicates a state where there is no high beam irradiation, and the states of the other auxiliary lamps (for example, fog lamps and clearance lamps) are optional.

Next, an example of control executed by the fail-safe control unit 48 will be specifically described.

Figure 6:
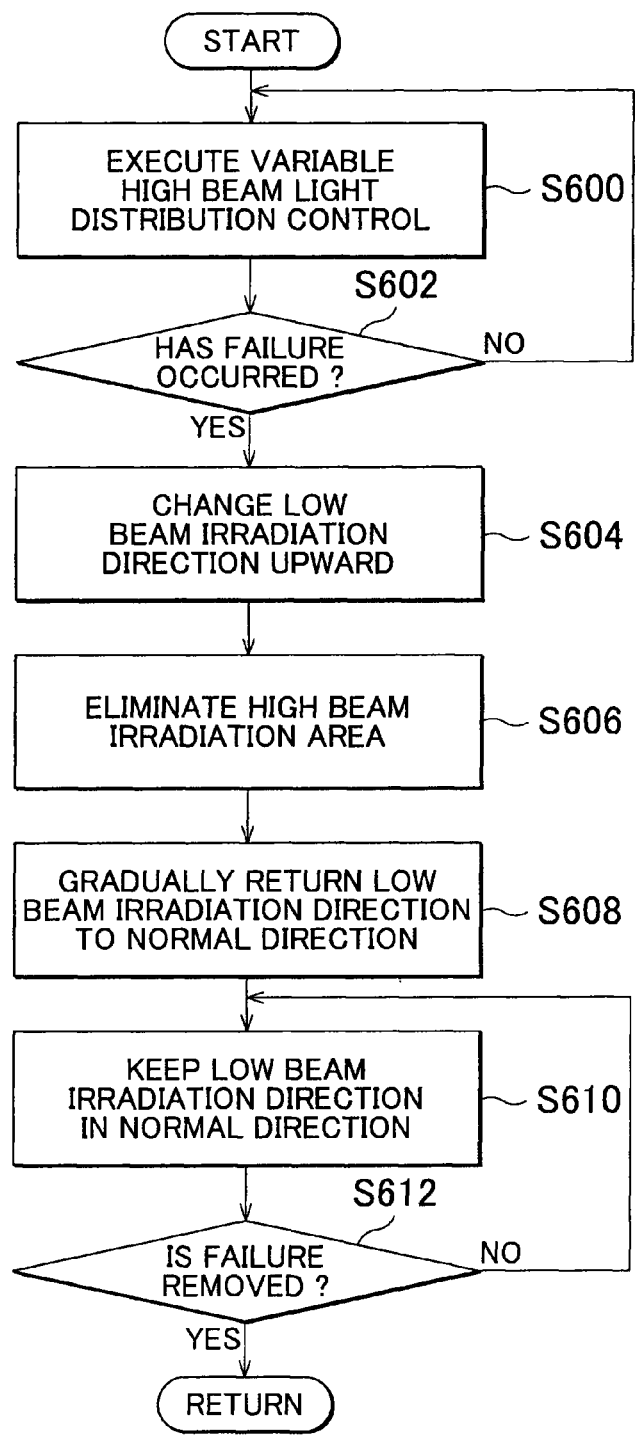
FIG. 6 is a flow chart that shows an example of major processes executed by the ECU of the embodiment.

FIG. 6 is a flow chart that shows an example of major processes (particularly, fail-safe control process) executed by the ECU 40 of the present embodiment. The processes shown in FIG. 6 may be repeatedly executed at predetermined cycles during variable high beam light distribution control. FIG. 7A to FIG. 7E are views that are associated with the processes shown in FIG. 6, and are views that show an example in which the light distribution pattern is changed at the time when the light distribution pattern is returned to a low beam pattern in the event of a failure. In FIG. 7A to FIG. 7E, an area irradiated by a low beam (low beam irradiation area) is indicated by X1, and an area irradiated by a high beam (high beam irradiation area) is indicated by X2. FIG. 8A to FIG. 8D are views that illustrate movement of the light distribution changing shade 70 in fail-safe control shown in FIG. 6. In FIG. 8A to FIG. 8D, irradiating portions (inverted from the irradiating portions shown in FIG. 3A to FIG. 3C) from the head lamp 50 toward the front of the vehicle are schematically shown when viewed from the vehicle.

Figure 7A:
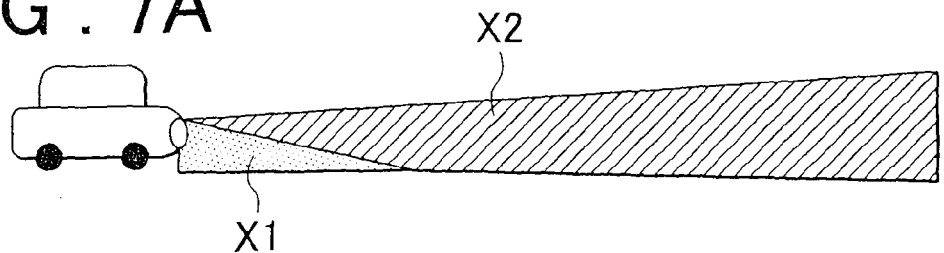
FIG. 7A to FIG. 7E are views that are associated with the processes shown in FIG. 6, and are views that show an example in which the light distribution pattern is changed at the time when the light distribution pattern is returned to a low beam pattern in the event of a failure.

In step 600, the variable high beam light distribution control unit 46 executes variable high beam light distribution control. Note that, during variable high beam light distribution control, typically, the split beam pattern or the high beam pattern is formed (see FIG. 8A). By so doing, as is schematically shown in FIG. 7A, the high beam irradiation area X2 is formed farther than the low beam irradiation area X1. Note that, during variable high beam light distribution control, the ultimate range (range of visibility) of the low beam irradiation area X1 may be, for example, about 40 m, and the ultimate range of the high beam irradiation area X2 may be, for example, about 170 m.

In step 602, the fail-safe control unit 48 executes failure determination. That is, the fail-safe control unit 48 determines whether there occurs a failure associated with variable high beam light distribution control. The failure is an abnormal event such that variable high beam light distribution control cannot be continued or variable high beam light distribution control should not be continued. The failure may, for example, relate to an abnormality of the image sensor 10, an abnormality of the ECU 40, an abnormality of a component in any one of the head lamps 50, or the like. However, an abnormality of the ECU 40, an abnormality of a component in any one of the head lamps 50, and the like, exclude abnormalities under which fail-safe control described below cannot be executed (for example, an abnormality of the fail-safe control unit 48, an abnormality of any one of the light distribution changing shades 70, an abnormality of any one of the leveling actuators 54, an abnormality in communication between the ECU 40 and any one of the head lamps 50, and the like). As a result of failure determination, when a failure has been detected, the process proceeds to step 604. Otherwise, the process returns to step 600, and variable high beam light distribution control is continued.

Figure 7B:
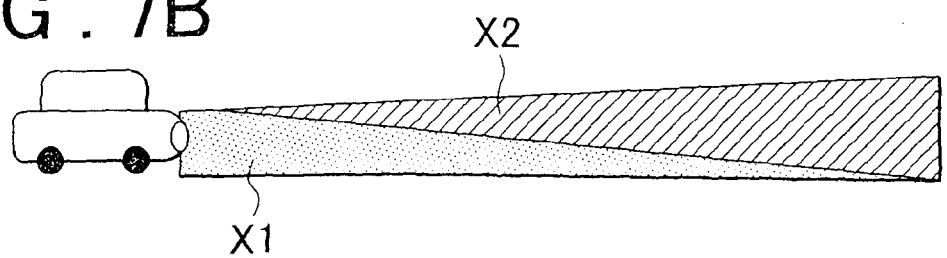
Figures 8A, 8B, 8C, 8D:
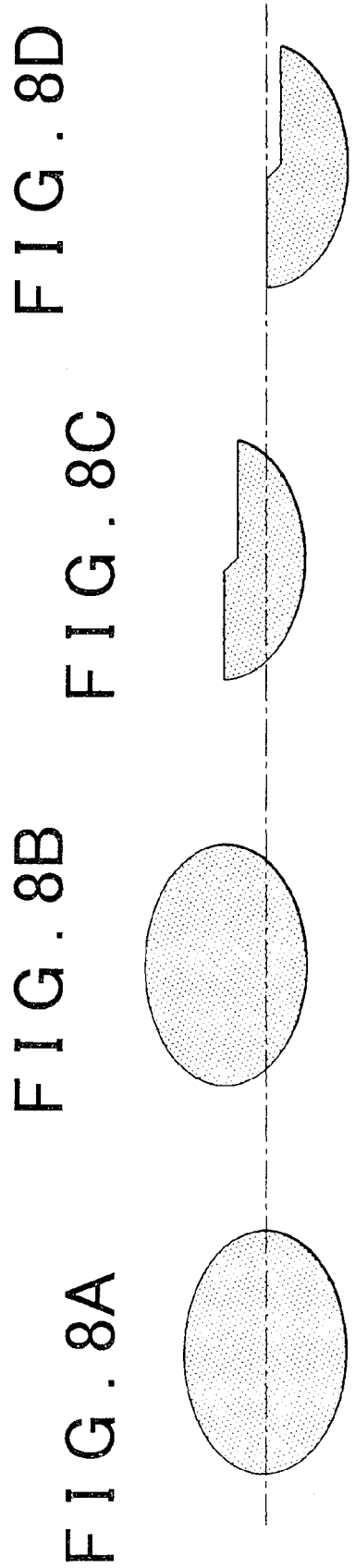
FIG. 8A to FIG. 8D are views that illustrate movement of the light distribution changing shade in fail-safe control shown in FIG. 6.

In step 604, the fail-safe control unit 48 controls the leveling actuators 54 to change the low beam irradiation direction upward (see FIG. 8B). By so doing, as is schematically shown in FIG. 7B, the ultimate range of the low beam irradiation area X1 is increased. The low beam irradiation direction may be desirably changed upward so that the ultimate range of the low beam irradiation area X1 coincides with the ultimate range of the high beam irradiation area X2. That is, the low beam irradiation direction may be changed so as to extend in a substantially horizontal direction. Alternatively, the low beam irradiation direction may be changed upward to a mechanical upper limit direction. However, the low beam irradiation direction may be selectively changed by any amount as long as the ultimate range of the low beam irradiation area X1 is increased as compared with that during normal times or during variable high beam light distribution control.

Note that, in step 604, as is schematically shown in FIG. 7B, the low beam irradiation direction is changed upward while the split beam pattern or the high beam pattern is maintained. Note that, when a high beam and a low beam are implemented by separate lamps (light sources), only the low beam irradiation direction is changed upward; however, when a high beam and a low beam are implemented by the same lamps (the same light sources), when the low beam irradiation direction is changed upward, the high beam irradiation direction may be changed upward accordingly.

Figure 7C:
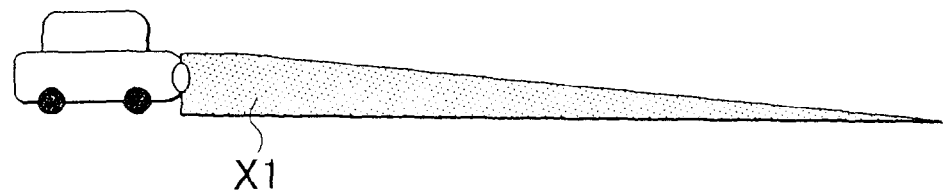

In step 606, the fail-safe control unit 48 controls the light distribution changing shades 70 to change the light distribution pattern from the split beam pattern or the high beam pattern to the low beam pattern (see FIG. 8C). Specifically, the fail-safe control unit 48 moves or holds the one-side high beam shades 74 of the right and left head lamps 50R and 50L to or in the retracted position, and moves the low beam shades 76 of the right and left head lamps 50R and 50L to the shielding position (see FIG. 3C). By so doing, as is schematically shown in FIG. 7C, the high beam irradiation area X2 disappears (that is, a high beam is stopped). Note that, when a high beam and a low beam are implemented by separate lamps (light sources), this step may be implemented by turning off high beam lamps. In addition, a high beam and a low beam are implemented by the same lamps and additional high beam lamps are provided, the additional high beam lamps are also turned off. In any cases, as is schematically shown in FIG. 7C, the high beam irradiation area X2 disappears. However, the low beam irradiation area X1 is extended to a distance through the process of step 604, so it is possible to reduce the influence on a driver (decrease in visibility). That is, even when the high beam irradiation area X2 disappears through the process of step 606, because the visibility in the low beam irradiation area X1 is increased through the process of step 604, it is possible to reduce the influence on the driver (decrease in visibility) due to disappearance of the high beam irradiation area X2.

Figure 7D:
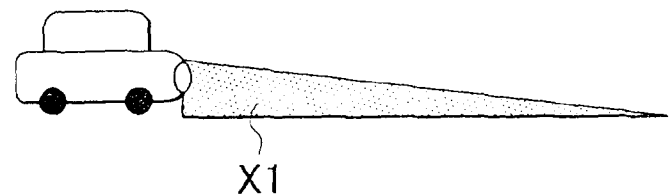
Figure 7E:
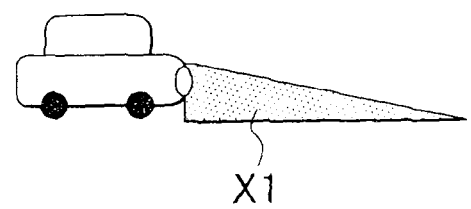

In step 608, the fail-safe control unit 48 controls the leveling actuators 54 to change the low beam irradiation direction downward (see FIG. 8D). At this time, the fail-safe control unit 48 gradually returns the low beam irradiation direction to a normal direction. Here, the normal direction is a direction at the time when fail-safe control is not executed, and is typically a direction (original direction) before the low beam irradiation direction is moved upward in step 604. However, the normal direction may slightly deviate from the original direction as long as the low beam irradiation area X1 satisfies requirements stipulated in predetermined laws and regulations. By so doing, as is schematically shown in FIG. 7D and FIG. 7E, the low beam irradiation area X1 extended to a distance is gradually returned to an original state. That is, the ultimate range of the low beam irradiation area X1 is gradually reduced to an original range (range in the state shown in FIG. 7A). By so doing, it is possible to prevent an inconvenience that the low beam irradiation direction remains changed upward, particularly, glare experienced by a driver, or the like, of a vehicle ahead. In addition, by gradually reducing the low beam irradiation area X1 extended to a distance, it is possible to prevent a sudden decrease in visibility, which occurs when the high beam irradiation area X2 suddenly disappears.

In step 610, the fail-safe control unit 48 keeps the low beam irradiation direction in the normal direction.

In step 612, the fail-safe control unit 48 determines whether the failure detected in step 602 is removed. When the failure is not removed, that is, when the failure detected in step 602 is continuously occurring, the process returns to step 610. In this case, the low beam irradiation direction is kept in the normal direction. Note that, at this time, an alarm for informing the driver of the failure detected in step 602 may be output from a meter, or the like. On the other hand, when the failure is removed, the process directly ends. In this case, variable high beam light distribution control may be resumed from the next cycle.

With the above described vehicle light distribution control device 1 according to the present embodiment, particularly, the following advantageous effects are obtained.

With the vehicle light distribution control device 1 according to the present embodiment, when a failure associated with variable high beam light distribution control has occurred during variable high beam light distribution control, variable high beam light distribution control may be quickly stopped. At this time, according to the present embodiment, the low beam irradiation direction is once changed upward and then the high beam irradiation area is eliminated, so it is possible to prevent a steep decrease in visibility, which occurs in the case where the high beam irradiation area suddenly disappears. In addition, according to the present embodiment, the high beam irradiation area is eliminated and then the low beam irradiation direction is gradually returned to the normal direction, so it is possible to shift into a low beam irradiation state while suppressing a steep decrease in visibility.

The embodiment of the invention is described in detail above; however, the aspect of the invention is not limited to the above described embodiment. Various modifications and replacements may be added to the above described embodiment without departing from the scope of the invention.

For example, in the above described embodiment, fail-safe control shown in FIG. 6 is executed during variable high beam light distribution control that is intended to reduce glare experienced by a driver, or the like, of a vehicle ahead with the use of the light distribution changing shades 70. Instead, the aspect of the invention may be applied to a failure during other light distribution control. For example, the aspect of the invention may be applied to a failure during light distribution control for automatically changing between a high beam and a low beam on the basis of, for example, whether there is a vehicle ahead (automatic high beam control). In this case as well, when a failure has occurred during high beam irradiation, similarly, the low beam irradiation direction is once changed upward and then the light distribution pattern is changed from a high beam to a low beam, and subsequently the low beam irradiation direction is gradually returned to the normal direction. In addition, the aspect of the invention may also be applied to variable high beam light distribution control that is intended to reduce glare experienced by a driver, or the like, of a vehicle ahead with only the swivel angles without using the light distribution changing shades 70.

In addition, in the above described embodiment, the light distribution changing shades 70 having a specific configuration are used. However, there are various types of configurations of each of the light distribution changing shades 70 (for example, see Japanese Patent Application Publication No. 2009-227088 (JP 2009-227088 A), Japanese Patent Application Publication No. 2010-000957 (JP 2010-000957 A), or the like), and any configuration may be employed. In addition, each light distribution changing shade may be configured to be slidable laterally. In addition, each light distribution changing shade may be configured to change a shielded area in the vertical direction.

In addition, with the above described fail-safe control shown in FIG. 6, the processes of step 604 to step 608 are executed as a series of successive operations; instead, a retention period of a set period of time may be provided between the steps. For example, after the high beam irradiation area is eliminated in step 606, the low beam irradiation direction may be retained for a predetermined period of time and then gradually returned to the normal direction. In addition, the process of step 604 and step 606 may be executed simultaneously. For example, in process of changing the low beam irradiation direction upward (for example, on the way to reach a target direction or immediately before reaching a target direction), the high beam irradiation area may be eliminated. In addition, a period of time taken to gradually return the low beam irradiation direction to the normal direction may also be constant or variable. Note that a period of time taken to gradually return the low beam irradiation direction to the normal direction in step 606 just needs to be significantly longer than a period of time taken to change the low beam irradiation direction upward in step 604.

The invention claimed is:

1. A vehicle light distribution control device comprising:
an electronic control unit configured to:
(a) detect occurrence of a failure associated with light distribution control during high beam irradiation,
(b) change a low beam irradiation direction upward when detecting the occurrence of the failure,
(c) stop the high beam irradiation after changing the low beam irradiation direction upward, and
(d) gradually return the low beam irradiation direction downward after stopping the high beam irradiation.

2. The vehicle light distribution control device according to claim 1, wherein the time during the high beam irradiation includes the time during which variable high beam light distribution control in which part of high beam light is shielded by a shade is being executed.

3. A vehicle light distribution control device comprising:
an illumination device configured to irradiate illumination light toward a front of a vehicle, that is controlled such that a light distribution pattern is changed at least between a high beam pattern and a low beam pattern, and that is controlled such that an optical axis direction varies in a substantially vertical direction; and
an electronic control unit configured to control the illumination device,
wherein the electronic control unit is configured to:
(a) detect occurrence of a failure associated with light distribution control during high beam irradiation,
(b) change a low beam irradiation direction upward when detecting the occurrence of the failure,
(c) stop the high beam irradiation after changing the low beam irradiation direction upward, and
(d) gradually returns the low beam irradiation direction downward after stopping the high beam irradiation.

4. A vehicle light distribution control method comprising:
detecting occurrence of a failure associated with light distribution control during high beam irradiation;
when occurrence of the failure has been detected, changing a low beam irradiation direction upward;
stopping the high beam irradiation after changing the low beam irradiation direction upward; and gradually returning the low beam irradiation direction downward after stopping the high beam irradiation.

5. The vehicle light distribution control method according to claim 4, further comprising:

when the detected failure is continuously occurring, maintaining the low beam irradiation direction in a normal direction.

* * * * *